United States Patent [19]
Harless et al.

[11] Patent Number: 6,084,954
[45] Date of Patent: Jul. 4, 2000

[54] SYSTEM AND METHOD FOR CORRELATING INCOMING AND OUTGOING TELEPHONE CALLS USING PREDICTIVE LOGIC

[75] Inventors: Charles E. Harless, Westwood Village, Calif.; Thaddeus J. Kowalski, Summit, N.J.

[73] Assignee: Lucent Technologies Inc., Murray Hill, Del.

[21] Appl. No.: 09/398,667

[22] Filed: Sep. 17, 1999

Related U.S. Application Data

[63] Continuation of application No. 08/940,241, Sep. 30, 1997.

[51] Int. Cl.[7] .................................................. H04M 15/00
[52] U.S. Cl. .................................... 379/140; 379/113
[58] Field of Search ........................ 379/111, 112, 379/113, 34, 265, 266, 133, 134, 137, 140, 141, 309

[56] References Cited

U.S. PATENT DOCUMENTS

| | | | |
|---|---|---|---|
| 5,155,763 | 10/1992 | Bigus et al. ............................ | 379/113 |
| 5,570,419 | 10/1996 | Cave et al. ............................. | 379/113 |
| 5,684,872 | 11/1997 | Flockhart et al. ..................... | 379/266 |
| 5,905,789 | 5/1999 | Will ....................................... | 379/211 |
| 5,920,623 | 7/1999 | Bensman et al. ..................... | 379/361 |

*Primary Examiner*—Paul Loomis

[57] ABSTRACT

For use with a communication station having a database containing past communication event information pertaining to the station, systems for, and methods of, predicting a future communication event pertaining to the station. In one embodiment, the system includes: (1) correlating logic that analyzes the past communication event information to determine whether a correlation exists in the past communication event information and (2) predicting logic, coupled to the correlating logic, that examines a current communication event pertaining to the station and predicts the future communication event based on the current communication event and the correlation.

23 Claims, 3 Drawing Sheets

| INCOMING NUMBER | 9089493209 | 2216048 | ... | 5826600 | 9088058217 |
|---|---|---|---|---|---|
| 3096711037 | .3 | .1 | | .2 | .1 |
| ⋮ | | | | | |
| 9089498348 | 0 | .2 | | .1 | .5 |
| 8109328755 | .1 | 0 | | 0 | .2 |

SYSTEM AND METHOD FOR CORRELATING INCOMING AND OUTGOING TELEPHONE CALLS USING PREDICTIVE LOGIC

CROSS-REFERENCE TO RELATED APPLICATION

This is a continuation of U.S. patent application Ser. No. 08/940,241, filed on Sep. 30, 1997, entitled "System and Method for Correlating Incoming and Outgoing Telephone Calls Using Predictive Logic" to Harless, et al., which is herein incorporated by reference.

TECHNICAL FIELD OF THE INVENTION

The present invention is directed, in general, to communications systems and, more specifically, to systems and methods for correlating incoming and outgoing telephone calls using predictive logic and a communication system employing the same.

BACKGROUND OF THE INVENTION

As personal computers have increased in power and decreased in size, portable computers have become more useful and powerful. Initially, portable computers were essentially ruggedized desktop computers, requiring use of a desk top and access to commercial power. Eventually, battery-powered portable computers commonly featuring a liquid crystal display (LCD) and weighing 10 to 20 pounds allowed true freedom for the computer user. Notebook computers weighing from 4 to 10 pounds and having a length and width approximating that of notebook paper offered an increased degree of portability, without substantially sacrificing desktop computer power.

Since the advent of the notebook computer, evermore smaller computers have been tested in the marketplace. However, the smaller units have not generally enjoyed much success, primarily due to limitations associated with the input/output (I/O) devices resulting from the reduced size of the computers. In particular, computer users wish to have a visual display that is as large as possible to display data either in greater quantity or with greater clarity. In addition, the size of a human hand dictates that a keyboard for manual data entry preferably be of a certain minimum size for comfort, speed and accuracy of the data entry. The display and keyboard of computers that are smaller than notebook computers have generally been downsized. The computers, therefore, are unable to duplicate desktop computer capability, even though the data processing and storage capacity is equivalent.

One smaller-than-notebook computer design, however, has proven useful and quite popular. The so-called personal digital assistant (PDA), such as the Newton™ by Apple Computer, Inc., includes a generally-rectangular chassis having a front surface thereon. The front surface is typically dominated by an LCD visual display device. In contrast to most other computer designs, the PDA does not contain a traditional "QWERTY" or other-style keyboard. Instead, the PDA is equipped with a few control buttons on the front surface and a stylus. A user wishing to enter data to the PDA must use the stylus to write on the display. Depending on the user's preferences, the PDA can store the user's writing as a bitmapped picture, requiring substantial memory storage capability and limiting the PDA's ability to manipulate the writing. Alternatively, with the advent of handwriting recognition software, the PDA can translate the writing into representative codes or characters suitable for more efficient processing and storage by the PDA. The stylus or the few control buttons on the front surface can also be used to move a pointer around the display to point at portions of a representation of a traditional keyboard shown on the screen. The stylus can further facilitate the entry of codes or characters.

Due to the high level of portability associated with the PDA (or other small computers, for that matter), the PDA may serve as a telephone directory for storing names and numbers. It may be desirable, however, to utilize the data processing and storage capabilities of the PDA to a larger extent than simply storing and displaying names and numbers on the display device. The PDA could be interfaced with a telecommunications device (such as a cellular or radio telephone) that would, for instance, allow the PDA to connect to networks, such as the Internet. The PDA would then have the ability to send and receive electronic mail or other data via the network, thus becoming much more than a simple telephone directory. Simply connecting the PDA to the telecommunications device may not, in itself, be sufficient. Under these circumstances, the user wishing to initiate a telephone call must still manually locate, retrieve and dial the appropriate telephone number. The user wishing to send an electronic mail is faced with the even greater burden of locating both the telephone number of the network and the appropriate electronic mail address.

Accordingly, what is needed in the art is a system and method for managing voice and data communications that provides greater ease of use and convenience to the user.

SUMMARY OF THE INVENTION

To address the above-discussed deficiencies of the prior art, the present invention provides, for use with a communication station having a database containing past communication event information pertaining to the station, systems for, and methods of, predicting a future communication event pertaining to the station.

In one embodiment, the system includes: (1) correlating logic that analyzes the past communication event information to determine whether a correlation exists in the past communication event information and (2) predicting logic, coupled to the correlating logic, that examines a current communication event pertaining to the station and predicts the future communication event based on the current communication event and the correlation.

The present invention therefore provides an intelligent station that finds patterns in past station use and bases predictions of future station use on such patterns. In one embodiment, the present invention employs retrieval circuitry to queue its predictions regarding future events for the station's user. The user may be presented with choices for future events automatically, relieving the user of having to enter or retrieve information pertaining to the future events manually and thus significantly enhancing the utility of the station.

In one embodiment of the present invention, the past communication event information is selected from the group consisting of: (1) information pertaining to calls received by the station, (2) information pertaining to calls originated by the station, (3) information pertaining to electronic mail received by the station, (4) information pertaining to electronic mail sent by the station, (5) information pertaining to local data retrieved from memory in the station and (6) information pertaining to network data retrieved by the station. Those skilled in the art should readily perceive other types of past communication event information that the present invention can use.

In one embodiment of the present invention, the correlation is selected from the group consisting of: (1) a correlation between an earlier single communication event and a later single communication event, (2) a correlation between the earlier single communication event and later multiple communication events, (3) a correlation between earlier multiple communication events and the later single communication event and (4) a correlation between the earlier multiple communication events and the later multiple communication events. Those skilled in the art should be familiar with the multitude of conventional correlation techniques that may be employed to derive relationships between or among data.

In one embodiment of the present invention, the past communication event information includes endpoint, date, time and duration information for past communication events pertaining to the station. Particular applications may benefit from the storage and analysis of other or additional past communication event information.

In one embodiment of the present invention, the correlating logic builds a probability matrix for the past communication event information to determine the correlation. Those skilled in the art should be familiar with the use of probability matrices. Of course, the present invention is not limited to a particular technique by which to determine correlations.

In one embodiment of the present invention, the station is selected from the group consisting of: (1) a personal digital assistant (PDA), (2) a personal computer (PC) and (3) a telephone. The present invention finds utility in any application wherein correlations exist between or among communication events and wherein prediction of future events is advantageous.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
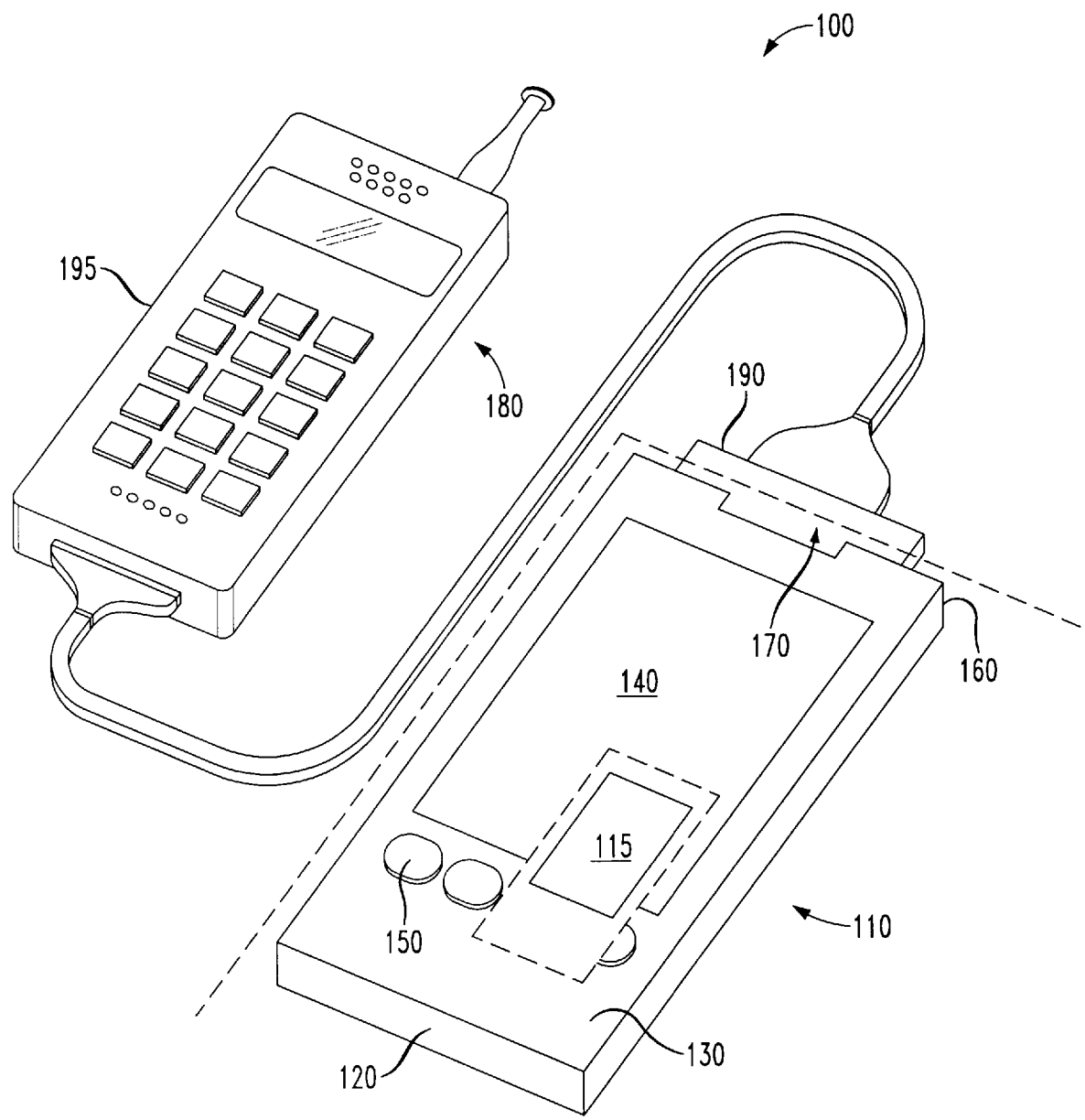
FIG. 1 illustrates an isometric view of one embodiment of a communication station constructed according to the principles of the present invention.

Referring to FIG. 1, illustrated is an isometric view of one embodiment of a communication station 100 constructed according to the principles of the present invention. The communication station 100 consists of data processing and storage circuitry 115 embodied within a PDA 110, and communication circuitry 180. The communication station 100 may alternatively consist of, without limitation, a screen phone or a multimedia personal computer (PC).

The PDA 110 possesses a substantially rectangular chassis 120 having a front surface 130. The front surface 130 contains, among other things, a display device 140 (that is conventionally an LCD screen) and one or more buttons or momentary switches 150 that allow a user to enter or manipulate information stored in the PDA 110. Apart from an electronic link connector 170 on a top edge 160 of the chassis 120, the PDA 110 of FIG. 1 is conventional in its hardware content and arrangement.

The electronic link connector 170 allows the PDA 110 to connect to the communication circuitry 180 including, in this embodiment, a cellular modem 190 and a cellular phone 195. Cellular modems and cellular phones are generally well known in the art and, as a result, the operation thereof will not be described. Those skilled in the art should also realize that the use of any device that relays communications between the PDA 110 and other communication stations is within the broad scope of the present invention. Of course, the communication circuitry 180 and the data processing and storage circuitry 115 may be implemented in a single physical device or in separate devices.

With the communication capabilities provided by the communication circuitry 180, the PDA 110 is no longer a mere telephone directory for storing names and addresses. The PDA 110 may now be an integral part of the communications experience, providing its user with the ability to place and receive telephone calls. The PDA may additionally connect to networks, such as the Internet, thereby providing its user with both electronic mail and network data retrieval capability.

Figure 2:
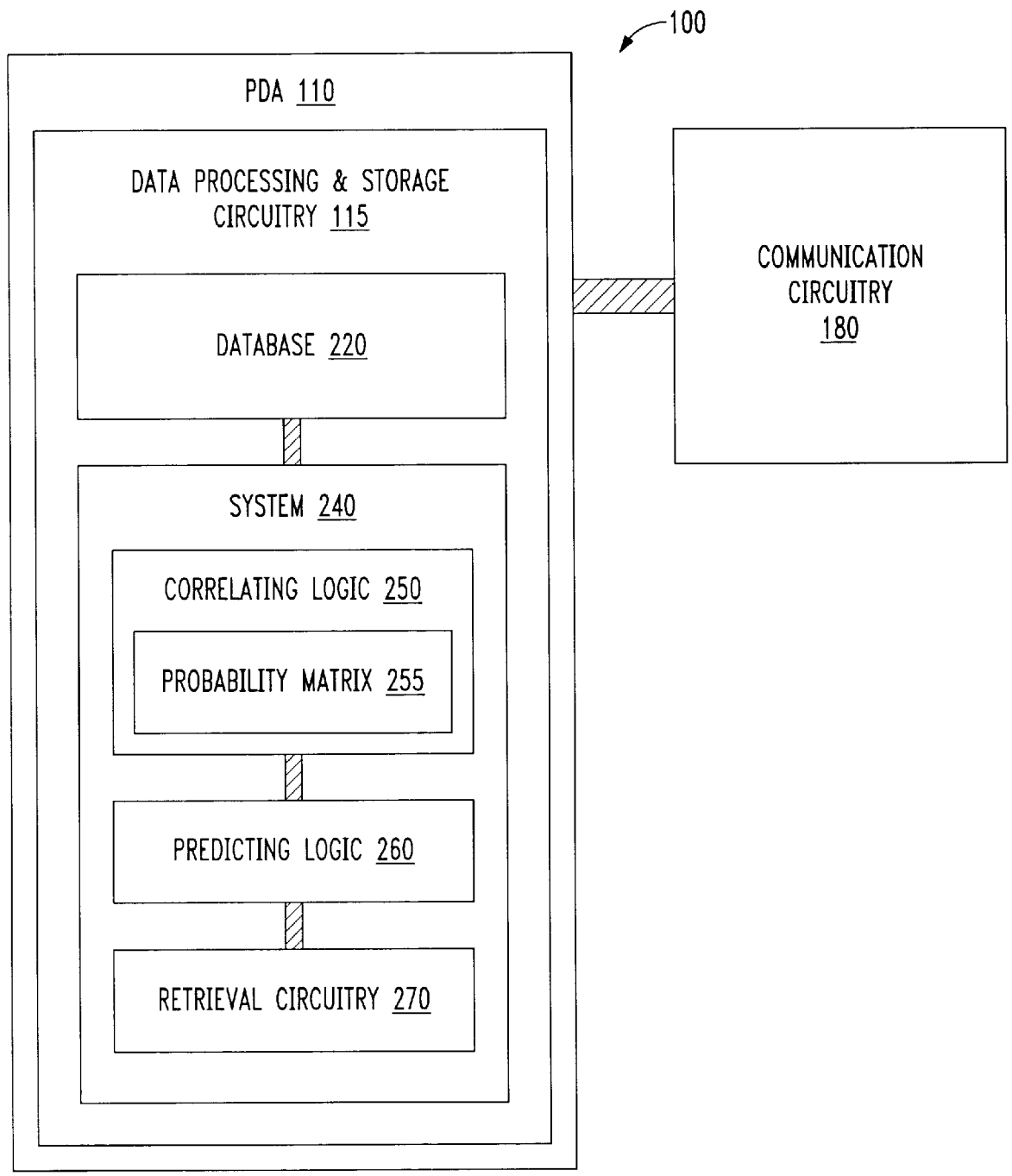
FIG. 2 illustrates a block diagram of a functional view of the communication station of FIG. 1.

Turning now to FIG. 2, illustrated is a block diagram of a functional view of the communication station 100 of FIG. 1. The data processing and storage circuitry 115 provides storage for a database 220 containing past communication event information. The past communication event information may include endpoint information such as telephone numbers of calls received (incoming number) and calls originated (outgoing number), addresses of electronic mail received and electronic mail sent (via, for instance, a facsimile or paging device), and filenames of local data retrieved from memory or network data retrieved by the user. Those skilled in the art should realize that the information stored in the database 220 is not limited to telephone numbers, electronic mail addresses, and filenames, but may also contain other parameters, for instance, date, time, and duration of the communication event.

A system 240 for predicting a future communication event pertaining to the PDA 110 is embodied in the data processing and storage circuitry 115. The system 240, in a preferred embodiment of the present invention, may be a sequence of software instructions executable in the data processing and storage circuitry 115. Those skilled in the art should understand, however, that the system may also be implemented in hardware, firmware, software, or any combination thereof. The system 240 includes correlating logic 250 that analyzes the past communication event information to determine whether, and to what extent, a correlation exists therein. The correlating logic 250 thereby creates the correlation based on patterns found in the past communication event information. The system 240 further includes predicting logic 260, coupled to the correlating logic 250. The predicting logic 260 examines a current communication event and predicts the future communication event based on both the current communication event and the correlation. The system 240 still further includes retrieval circuitry 270, coupled to the predicting logic 260, that retrieves the appropriate endpoint information pertaining to the predicted future communication event from the database 220. The user may then be presented with a choice of communication events. If the user so desires, the retrieval circuitry 270 supplies the endpoint information to the communication circuitry 180, allowing the future communication event to be easily and automatically initiated.

The system 240, in a simple embodiment of the present invention, functions as follows. Past communication event information, for instance, incoming numbers and outgoing numbers, are stored in the database 220. Commonly available services, such as Caller ID, allow the communication station 100 to easily identify the incoming numbers. The outgoing numbers, on the other hand, may be stored as the user places the call. This embodiment of the present invention refers only to telephone numbers for simplicity in describing the function of the system 240. Those skilled in the art should understand that the information stored in the database 220 is not limited to endpoint information such as telephone numbers but may also include other transactional information, such as the date, time and duration of the telephone call. Additionally, information relating to other communication events, such as electronic mail and the retrieval of data, may also be stored in the database 220 for use by the correlating logic 250.

The correlating logic 250, in the illustrated embodiment, builds a probability matrix 255 from the information in the database 220 to determine the correlation, if any, between the past communication events. Of course, other methods of determining correlation that do not require the use of a probability matrix (such as a working set model; see *The Working Set Model for Program Behavior*, by P. J. Denning, Communication ACM, volume 11, number 5, May 1968, which is incorporated herein by record) are within the broad scope of the present invention. In the illustrated embodiment of the present invention, the correlating logic 250 seeks a one-to-one correspondence, relating an earlier single communication event (e.g., the incoming number) to a later single communication event (e.g., the outgoing number). In a preferred embodiment of the present invention, the correlating logic 250 relates a plurality of earlier communication events to a plurality of later communication events. The correlating logic 250 may thus more accurately determine the user's communication pattern. Alternatively, the correlating logic 250 may correlate the earlier single communication event to later multiple communication events, or earlier multiple communication events to the later single communication event.

The predicting logic 260 then takes a current communication event, the incoming number, and predicts a future communication event, the outgoing number. The predicting logic 260 makes this prediction based on the incoming number and the associated correlation in the probability matrix 255.

The predicting logic 260 then sends, in this embodiment, an ordered list of outgoing numbers to the retrieval circuitry 270, which then displays the outgoing numbers on the display of the communication station 100. The user may then simply confirm the selection of the telephone number, automatically initiating the call. Prior to the present invention, the user was required not only to search through the PDA's 110 telephone directory to find the appropriate telephone number, but also to manually dial the telephone number. By predicting the future communication event, the present invention allows the communication station 100 to provide its user with greater convenience and ease of use and, also, reduces the cost of the device.

Figure 3:
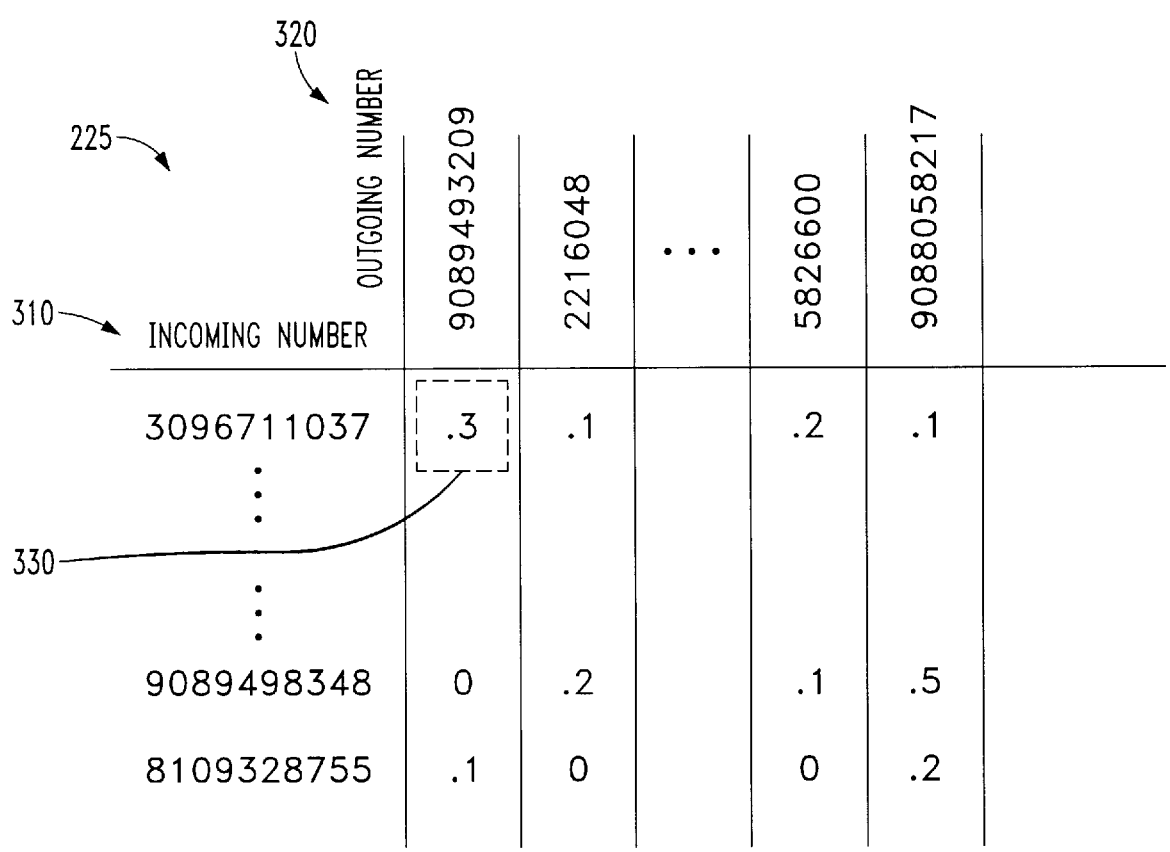
FIG. 3 illustrates one embodiment of a probability matrix generated in accordance with the principles of the present invention.

Turning now to FIG. 3, illustrated is the probability matrix 255 of FIG. 2 generated in accordance with the principles of the present invention. With continuing reference to FIGS. 1 and 2, the probability matrix 255 will now be described in more detail. The probability matrix 255 consists of an array containing a first field 310 and a second field 320. The first field 310 consists of, in this embodiment of the present invention, incoming numbers. The second field 320 consists of outgoing numbers. A plurality of probability indicators (one of which is designated 330) is stored in locations defined by the intersection of the first and second fields 310, 320. Those skilled in the art should understand that while the probability matrix illustrated in FIG. 3 consists of two fields containing the incoming and outgoing numbers, further enhancements of the probability matrix to include other factors, such as the date, time and duration of the calls may increase the accuracy of the correlation data. The probability matrix 255, in a preferred embodiment of the present invention, correlates not only information referring to telephone calls, but also information referring to electronic mail, data retrieval. Of course, the probability matrix may contain information relating to other functions performed by the user of the communication station 100.

The probability matrix 255 operates as follows. If a call received from the incoming number results in a later origination of a call to the outgoing number, the probability indicator 330 corresponding to the correlation between the incoming number and the outgoing number is increased proportionately; the probability factor corresponding to the outgoing numbers not dialed is decreased accordingly. Thus, The probability matrix may be continually updated as the communication station 100 is used to send and receive calls. It should be understood, that other methods of generating and updating the probability matrix to represent the correlation between past communication event information are within the broad scope of the present invention. Additionally, those skilled in the art should realize that the set of past communication events used to build the probability matrix may include all prior calls, or may be limited by the user to any number of most recent calls.

Although the present invention has been described in detail, those skilled in the art should understand that they can make various changes, substitutions and alterations herein without departing from the spirit and scope of the invention in its broadest form.

What is claimed is:

1. For use with a communication station having a database containing past communication event information pertaining to said station, a system for correlating communication events, comprising:

correlating logic that analyzes said past communication event information by correlating at least one past incoming communication event to at least one subsequent past outgoing communication event to determine a communication pattern;

predicting logic that receives a current incoming communication event and predicts a future outgoing communication event based on said current incoming communication event and said communication pattern; and retrieval circuitry, coupled to said predicting logic, that provides said future outgoing communication event to a user thereby allowing said user to initiate said future outgoing communication event.

2. The system as recited in claim 1 wherein said past communication event information is selected from the group consisting of:
   information pertaining to calls received by said station,
   information pertaining to calls originated by said station,
   information pertaining to electronic mail received by said station,
   information pertaining to electronic mail sent by said station,
   information pertaining to local data retrieved from memory in said station, and
   information pertaining to network data retrieved by said station.

3. The system as recited in claim 1 wherein said communication pattern is selected from the group consisting of:
   a correlation between an earlier single communication event and a later single communication event,
   a correlation between said earlier single communication event and later multiple communication events,
   a correlation between earlier multiple communication events and said later single communication event, and
   a correlation between said earlier multiple communication events and said later multiple communication events.

4. The system as recited in claim 1 wherein said retrieval circuitry retrieves data pertaining to said future outgoing communication event from said past communication event information to allow said user to initiate said future outgoing communication event automatically.

5. The system as recited in claim 1 wherein said past communication event information includes endpoint, date, time and duration information.

6. The system as recited in claim 1 wherein said correlating logic builds a probability matrix for said past communication event information to determine said communication pattern.

7. The system as recited in claim 1 wherein said correlating logic and said predicting logic are embodied in data processing and storage circuitry.

8. The system as recited in claim 1 wherein said correlating logic and said predicting logic are embodied as a sequence of software instructions executable in data processing and storage circuitry.

9. For use with a communication station having a database containing past communication event information pertaining to said station, a method of correlating communication events, comprising:
   analyzing said past communication event information by correlating at least one past incoming communication event to at least one subsequent past outgoing communication event to determine a communication pattern;
   receiving a current incoming communication event;
   predicting a future outgoing communication event based on said current incoming communication event and said communication pattern; and
   providing said future outgoing communication event to a user thereby allowing said user to initiate said future outgoing communication event.

10. The method as recited in claim 9 wherein said past communication event information is selected from the group consisting of:
   information pertaining to calls received by said station,
   information pertaining to calls originated by said station,
   information pertaining to electronic mail received by said station,
   information pertaining to electronic mail sent by said station,
   information pertaining to local data retrieved from memory in said station, and
   information pertaining to network data retrieved by said station.

11. The method as recited in claim 9 wherein said communication pattern is selected from the group consisting of:
   a correlation between an earlier single communication event and a later single communication event,
   a correlation between said earlier single communication event and later multiple communication events,
   a correlation between earlier multiple communication events and said later single communication event, and
   a correlation between said earlier multiple communication events and said later multiple communication events.

12. The method as recited in claim 9 wherein said providing comprises retrieving data pertaining to said future outgoing communication event from said past communication event information to allow said user to initiate said future communication event automatically.

13. The method as recited in claim 9 wherein said past communication event information includes endpoint, date, time and duration information.

14. The method as recited in claim 9 wherein said analyzing comprises building a probability matrix for said past communication event information to determine said communication pattern.

15. The method as recited in claim 9 wherein said analyzing, receiving, predicting and providing are performed within data processing and storage circuitry.

16. The method as recited in claim 9 wherein said analyzing, receiving, predicting and providing are performed by executing a sequence of software instructions in data processing and storage circuitry.

17. A communication station, comprising:
   data processing and storage circuitry;
   communication circuitry, coupled to said data processing and storage circuitry, that relays communications between said station and other stations;
   a database, stored in said data processing and storage circuitry; that contains past communication event information pertaining to said station; and
   a system, executable in said data processing and storage circuitry, for correlating a future communication event pertaining to said station, including:
      correlating logic that analyzes said past communication event information by correlating at least one past incoming communication event to at least one subsequent past outgoing communication event to determine a communication pattern,
      predicting logic that receives a current incoming communication event and predicts a future outgoing communication event based on said current incoming communication event and said communication pattern, and
      retrieval circuitry that provides said future outgoing communication event to said communication circuitry to allow a user to initiate said future communication event automatically.

18. The station as recited in claim 17 wherein said past communication event information is selected from the group consisting of:

information pertaining to calls received by said station, information pertaining to calls originated by said station, information pertaining to electronic mail received by said station, information pertaining to electronic mail sent by said station, information pertaining to local data retrieved from memory in said station, and information pertaining to network data retrieved by said station.

19. The station as recited in claim 17 wherein said communication pattern is selected from the group consisting of:

correlation between an earlier single communication event and a later single communication event, a correlation between said earlier single communication event and later multiple communication events, a correlation between earlier multiple communication events and said later single communication event, and a correlation between said earlier multiple communication events and said later multiple communication events.

20. The station as recited in claim 17 wherein said past communication event information includes endpoint, date, time and duration information.

21. The station as recited in claim 17 wherein said correlating logic builds a probability matrix for said past communication event information to determine said communication pattern.

22. The station as recited in claim 17 wherein said data processing and storage circuitry are embodied in a personal digital assistant (PDA).

23. The station as recited in claim 17 wherein said station is a multimedia personal computer.

* * * * *